United States Patent
Wass et al.

(10) Patent No.: US 10,505,794 B2
(45) Date of Patent: Dec. 10, 2019

(54) CONFIGURATION OF DISTRIBUTED DATA ACQUISITION EQUIPMENT

(71) Applicant: SCA Hygiene Products AB, Göteborg (SE)

(72) Inventors: Andreas Wass, Borlänge (SE); Erik Lärfars, Borlänge (SE)

(73) Assignee: ESSITY HYGIENE AND HEALTH AKTIEBOLAG, Göteborg (SE)

(*) Notice: Subject to any disclaimer, the term of this patent is extended or adjusted under 35 U.S.C. 154(b) by 134 days.

(21) Appl. No.: 15/102,683

(22) PCT Filed: Dec. 11, 2013

(86) PCT No.: PCT/EP2013/076209
§ 371 (c)(1),
(2) Date: Jun. 8, 2016

(87) PCT Pub. No.: WO2015/086059
PCT Pub. Date: Jun. 18, 2015

(65) Prior Publication Data
US 2016/0380813 A1    Dec. 29, 2016

(51) Int. Cl.
*H04L 29/08* (2006.01)
*H04L 12/24* (2006.01)

(52) U.S. Cl.
CPC .......... *H04L 41/0803* (2013.01); *H04L 67/10* (2013.01); *H04L 67/125* (2013.01); *H04L 67/34* (2013.01); *H04L 41/0813* (2013.01); *Y04S 40/162* (2013.01); *Y04S 40/18* (2018.05)

(58) Field of Classification Search
CPC .......... H04L 67/10; H04L 67/12; H04L 67/34

USPC ......................................................... 709/220
See application file for complete search history.

(56) References Cited

U.S. PATENT DOCUMENTS

| 7,726,599 B2 | 6/2010 | Lewis et al. |
| 2005/0251403 A1 | 11/2005 | Shuey |
| 2009/0119142 A1* | 5/2009 | Yenni ................ G06Q 10/06 705/7.15 |

(Continued)

FOREIGN PATENT DOCUMENTS

| CN | 1901829 A | 1/2007 |
| CN | 101794121 A | 8/2010 |

(Continued)

OTHER PUBLICATIONS

Australian examination report No. 1 dated Feb. 3, 2017 issued in counterpart Australian patent application No. 2013407373 (3 pages).

(Continued)

*Primary Examiner* — Glenford J Madamba
(74) *Attorney, Agent, or Firm* — Drinker Biddle & Reath LLP (57) ABSTRACT

Configuring distributed data acquisition equipment including at least one data collection unit and at least one data acquisition unit coupled to the data collection unit, including obtaining configuration data for the at least one data acquisition unit, generating a message comprising the configuration data, transmitting said message to a data collection unit coupled to the at least one data acquisition unit, extracting in the data collection unit the configuration data, and transmitting the extracted configuration data to the at least one data acquisition unit.

24 Claims, 4 Drawing Sheets

(56) References Cited

U.S. PATENT DOCUMENTS

2012/0149353 A1 6/2012 Helfrich
2014/0120972 A1* 5/2014 Hartman ............... H04W 88/02
　　　　　　　　　　　　　　　　　　　　　　　　455/509

FOREIGN PATENT DOCUMENTS

| CN | 103138396 A | 6/2013 | |
|---|---|---|---|
| EP | 2663089 A1 * | 11/2013 | ............... H04Q 9/00 |
| EP | 2663089 A1 | 11/2013 | |
| RU | 2485582 C1 | 6/2013 | |
| WO | WO-2005/033960 A1 | 4/2005 | |
| WO | WO-2005/065509 A1 | 7/2005 | |
| WO | WO-2006/119323 A2 | 11/2006 | |
| WO | WO 2006119323 A2 * | 11/2006 | ......... G05B 13/0275 |

OTHER PUBLICATIONS

Russian Office Action dated Nov. 7, 2017 issued in corresponding Russian patent appliction No. 2016127580 (10 pages) and its English-language translation thereof (7 pages).
European Office Action dated Sep. 3, 2018 issued in corresponding European patent application No. 13 802 978.
First Chinese Office Action dated Jul. 16, 2018 issued in corresponding Chinese patent application No. 201380081511.4 (15 pages) and its English-language translation thereof (20 pages).
Russian Decision to Grant issued in corresponding Russian patent application No. 2016127580 dated Jun. 14, 2018 (11 pages) and its English-language translation thereof (6 pages).
European Office Action dated Apr. 24, 2018 issued in corresponding European patent application No. 13 802 978.
Second Chinese Office Action dated Mar. 19, 2019 issued in corresponding Chinese patent application No. 201380081511.4 (13 pages) and its English-language translation thereof (19 pages).
Third Chinese Office Action dated Aug. 5, 2019 issued in corresponding Chinese patent application No. 201380081511.4 (10 pages) and its English-language translation thereof (15 pages).

* cited by examiner

CONFIGURATION OF DISTRIBUTED DATA ACQUISITION EQUIPMENT

CROSS-REFERENCE TO PRIOR APPLICATION

This application is a § 371 National Stage Application of PCT International Application No. PCT/EP2013/076209 filed Dec. 11, 2013, which is incorporated herein in its entirety.

TECHNICAL FIELD

The present disclosure relates to the field of configuring distributed data acquisition equipment which transmits acquired data via intermediate data collection equipment to some central entity. Specifically, the present disclosure relates to distributed data acquisition equipment, data collection equipment, a central entity, and to systems thereof, and to methods of configuring distributed data acquisition equipment. More specifically, the present disclosure relates to the field of distributed data acquisition as part of facility management.

BACKGROUND

Distributed data acquisition is becoming more and more popular in various environments, such as scientific research, industrial equipment, network management, facility management, and the like. With the advent of the so-called "internet of things", distributed stand-alone devices or applications get on-line, so as to gather local information, possibly process it, and forward or transmit the acquired data to some central entity for further processing and/or evaluation.

In general, distributed data acquisition equipment comprises individual data acquisition units that are usually located at some point of interest for gathering desired information. For example, a sensor device measures some physical figure at a specific point in an industrial manufacturing environment, a probe application measures some local network load at some specific routing equipment in a network, or some sensor measures usage of a resource in a facility (e.g. water, electricity, etc.). Common to the conventional concepts is that the (locally) gathered information, i.e. the acquired data, is transmitted in some form or another to a central entity, so that the acquired data can be processed, analyzed, and evaluated. Based on such an evaluation, decisions can be taken, processing parameters can be adjusted, network traffic can be re-routed, etc.

One specific field of application is facility management, where use of consumables and supply thereof need to be management on a large scale. For example, large organizations such as companies, authorities, etc. provide communal facilities for the use of e.g. employees, visitors, and other personnel. In the context of a commercial establishment, such facilities may include washrooms, conference rooms, document preparation stations, food preparation stations, maintenance stations, local supply storage, and other similar facilities.

Each facility may be associated with storage locations or dispensing locations where consumable items to be used in and around the facility may be stored ready for use, and where discarded consumables may be deposited for disposal. In the case of washrooms, such storage locations may comprise lavatory paper dispensers, handwash or antibacterial gel dispensers, refuse bins, and hygiene product dispensers. Where the facility is a document preparation center, a storage location may include paper storage locations, cartridge storage locations, stationery item storage locations, and the like. Where the facility is a maintenance area, storage locations may include storage locations for different parts, and for maintenance and cleaning compounds, as well as, for example, handwash dispensers and paper towel dispensers. Such locations generally provide a resource to users of the facility. Especially, the resource may be a consumable, or may be space for depositing used consumables and/or refuse. In each case, the resource may be depleted by users of the facility.

The management of such facilities is generally not provided by the local users of the facilities but is often delegated to a facilities management group within the organization or outsourced to a facilities management contractor. Such a facilities management group or contractor is then responsible for ensuring that the supplies in each of the storage locations in each of the facilities are maintained at a correct level, i.e., in the case of dispensers or consumable stores, the supplies are maintained at a level which ensures that they do not run out in the course of normal usage, and in the case of waste receptacles, that they are sufficiently regularly emptied before they become full. Allowing a consumable to run out or allowing a waste receptacle to become full causes great inconvenience to the users of facilities, and, especially in settings such as health care establishments, can even lead to serious hygiene issues.

It has therefore become customary for such facilities management groups or contractors to deploy teams of workers who are tasked to perform regular checks on the facilities, to re-supply consumables that are depleted and to empty waste that has accumulated. However, the need to conduct repeated checks on facilities to guard against even the possibility of a resource running low or a waste store becoming full to capacity is very time- and effort-intensive. Therefore, such activities represent a relatively high operating cost and burden for the facilities management group or contractor.

Such management may present a significant organizational and logistical challenge, and relies heavily on the experience of both managers and workers. Such challenges include ensuring that each facility is visited sufficiently regularly to assess the resourcing requirements of each location in the facility, and to replenish and/or empty the locations as appropriate. Further challenges include ensuring that facilities are maintained in adequate condition without needing to provide very large areas for the storage of waste or to maintain a large stock of consumables in the facilities themselves, on the supply carts, or at a central location. Finally a significant challenge is to manage the facilities in such a way so as to respond to unusual events which result in the sudden depletion of one or more resources or a sudden accumulation of waste.

There is therefore a need in various environments to gather local information so as to allow for better management and control of larger organizations. The use of distributed data acquisition allows for gathering the required information at the actual point of interest, e.g. at a specific restroom, at an individual printer/photocopier, at a specific machine in a manufacturing environment, at a specific router in a network, and the like.

However, since the equipment that actually acquires the data is distributed and thus located at various individual (possibly remote) locations, the information flow toward the central entity can be facilitated by means of data collection equipment that bundles information gathered from one or more data acquisition units. At the same time, also a communication path downstream from a central entity to the individual data acquisition units can be required. Most notably, configuration and setup of the individual units may require the transmission of (configuration) data from the central entity to one specific data acquisition unit. The configuration data may determine the behavior of the unit, such as acquisition interval, precision, figure selection, power-on/off state, etc. Such configuration may very much enhance usability of data acquisition systems, since it allows improved management, sustainability, and also allows for the possibility to react to specific events that the system is exposed to.

Since, both the data collection equipment as well as the data acquisition equipment can be distributed, the volume of the transmitted data may be subject to various limitations. For example, network bandwidth is limited by cost, radio spectrum usage, transmission range, power supply of the individual units (e.g. battery life), and the like.

Given the broad distribution and large number of individual collection and acquisition units in the above-discussed, large-scale implementations, it is, therefore highly desirable that the configuration of distributed data acquisition equipment makes efficient use of the available resources, including communication and transmission bandwidth, power consumption, battery life of cord-less, battery-powered remote devices, and the like.

SUMMARY

According to an aspect, there is provided a method of configuring distributed data acquisition equipment including at least one data collection unit and at least one data acquisition unit coupled to the data collection unit. The method includes the steps of obtaining configuration data for the at least one data acquisition unit; generating a message including the configuration data; transmitting said message to a data collection unit coupled to the at least one data acquisition unit; extracting in the data collection unit the configuration data; and transmitting the extracted configuration data to the at least one data acquisition unit.

According to another aspect, there is provided a data collection unit for receiving acquired data from a data acquisition unit, the data collection unit being configured to: receive a message including configuration data; determine a target data acquisition unit to which the configuration data is to be transmitted; extract the configuration data from the message; and to transmit the extracted configuration data to the target data acquisition unit.

According to another aspect, there is provided a system including distributed data acquisition equipment including at least one data collection unit and at least one data acquisition unit coupled to the data collection unit, the system being configured for configuring the distributed data acquisition equipment to obtain configuration data for the at least one data acquisition unit; generate a message including the configuration data; transmit said message to a data collection unit coupled to the at least one data acquisition unit; extract in the data collection unit the configuration data; and to transmit the extracted configuration data to the at least one data acquisition unit.

BRIEF DESCRIPTION OF THE DRAWINGS

Embodiments of the present invention, which are presented for better understanding the inventive concepts and which are not to be seen as limiting the invention, will now be described with reference to the Figures in which.

DETAILED DESCRIPTION

Figure 1A:
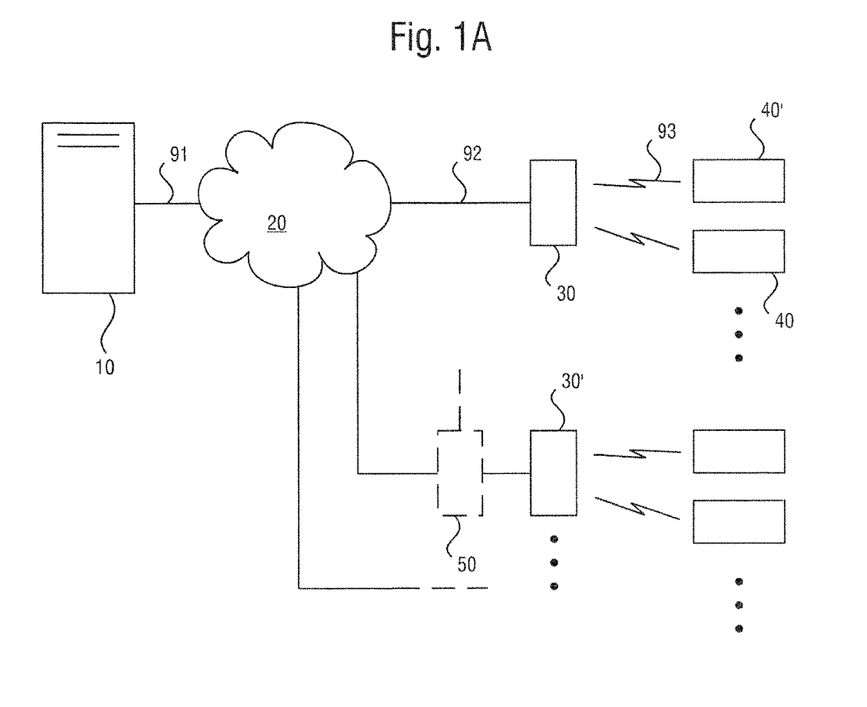
FIG. 1A shows a schematic view of a data acquisition system including a central entity, data collection equipment, and data acquisition equipment according to an embodiment of the present invention.

FIG. 1A shows a schematic view of a data acquisition system including a central entity, data collection equipment, and data acquisition equipment. More specifically, the data acquisition system of FIG. 1A involves a central entity 10, data collection equipment in the form of one or more data collection units 30, 30', and data acquisition equipment in the form of one or more data acquisition units 40, 40'. The central entity 10 can exchange data with the data collection units 30, 30' by use of some kind of network or network system 20, possibly including the internet, one or more corporate networks, and/or public networks, such as telephone or mobile communication networks.

As an example, a first link 91 couples the central entity 10 to the network 20, and a second link 92 couples the at least one data collection unit 30 to network 20. As further examples, link 92 between the data collection unit 30 and network 20 can be a direct or a quasi-direct internet connection via, for example, a DSL or LAN line. Further, also wireless data transmission can be employed, so that the data collection equipment 30, 30' communicates via an air interface (GSM, UMTS, WLAN, WiFi, WiMaX, and the like) to a mobile communications network or respective access point, and with this to network 20.

Optionally, one or more data collection unit(s) 30' of the data collection equipment may be coupled by one or more intermediate data collection level(s) to the network 20. One way is to implement optional intermediate level equipment 50 between the data collection units and the network 20. Such optional level equipment (units) may in turn collect, process, and/or forward data from one or more data collection units 30' to, from, or between network 20. For example, optional equipment 50 can be provided on a building-, section-, department-, or story-level. In this way, corresponding equipment 50 collects, processes, and/or forwards data from and to data collection equipment 30' that is, respectively, arranged in one section, one building, one department, or on one story. For example, all data collection units 30' installed on one floor of a building may exchange data to a corresponding level unit 50, which, in turn, exchanges data with a level unit provided for one building, for one site, and so on. In general, the level equipment may be provided in line with facility properties, in the sense that one level is provided for on a facility site level, a subordinate level is provided on a site building level, and another subordinate level is provided on a building story/floor level.

The data acquisition equipment is in the form of at least one data acquisition unit 40 arranged at a corresponding location for acquiring data (gathering information). This data can be acquired by use of one or more sensors that are configured to convert some physical figure into a numerical value that is suitable for transmission on a communication network. Said physical figures may include any measurable quantity, such as temperature, illumination, time and date, air pressure, humidity, current, voltage, resistance, and the like. More specifically, the measured figure may reflect some device state, such as a consumption figure, filling level, expiry date, and the like. For example, a light-barrier may employ a light source and a light sensor that measures illumination intensity for determining a filling level of a dispenser or waste bin. Other suitable concepts that can be sensed via a physical figure include infrared detection, ultraviolet detection, Radio frequency (RF) detection, ultrasonic detection, etc.

In a particular embodiment, one individual data acquisition unit 40 communicates with at least one data collection unit 30 over a link 93. Said link 93 is preferably a wireless link, such as a radio or infrared link, which, in turn, may follow one or more applicable standards (e.g. IrDA, IEEE802.15.4, Zigbee, RF4CE, SP100, IEEE802.11, Bluetooth™, or similar technologies). In this way, full bidirectional data exchange becomes possible between the central entity 10 on the one hand and one individual data acquisition 40, 40' on the other.

Specifically, the central entity 10 can transmit data over link 91, network 20, link 92, the associated data collection unit 30, and link 93 to the particular data acquisition unit 40'. Likewise, the individual data acquisition unit 40' can transmit data back to the central entity 10 over link 93, the associated data collection unit 30, link 92, network 20, and link 91. As an example, data in the downlink, i.e. in a direction from the central entity 10 to a data acquisition unit, may include configuration data, whereas data in the uplink, i.e. in the direction from one data acquisition unit to the central entity 10, may include sensor data representing locally acquired data in a format suitable for transmission and further processing.

The downlink enables centralized configuration of the distributed data collection and acquisition equipment from, say, the central entity 10. Such configuration can be effected globally (i.e. all connected equipment), group-wise (e.g. all data acquisition units 40 that are coupled to one specific data collection unit 30 or to units 30 arranged in one story, building, site, etc.), or on an individual level of one particular data acquisition unit. The configuration data as such may determine the behavior of one data acquisition unit 40, 40', such as setting an acquisition interval (i.e. a period in which data acquisition is repeated), precision (i.e. precision of the data to be acquired and/or forwarded, averaging cycles, etc.), figure selection (e.g. one out several possible measurements is chosen), setting a unit into a power-on, power-off, or idle state, or setting the transmission interval with which the data acquisition unit 40' transmits the acquired data to the associated data collection unit 30.

As far as the association amongst the data acquisition and the data collection equipment is concerned, it is to be noted that it can have a one-to-many association amongst one data collection unit 30 and one or more data acquisition units 40. Specifically, one data acquisition unit 40 can be configured to communicate only with one associated data collection unit 30, which, in turn, is aware of all associated data acquisition units. This can be affected by preprogramming the respective units or by means of a registration procedure during which one data acquisition unit 40 and one data collection unit 30 are associated to each other. In any way, the result is that one data collection unit 30 can individually address one associated data acquisition unit 40. Therefore, upon receipt of configuration data addressed for one specific data acquisition unit, the data collection unit can determine whether the requested data acquisition unit is accessible and the data collection unit can address and transmit the configuration to the target data acquisition unit.

Figure 1B:
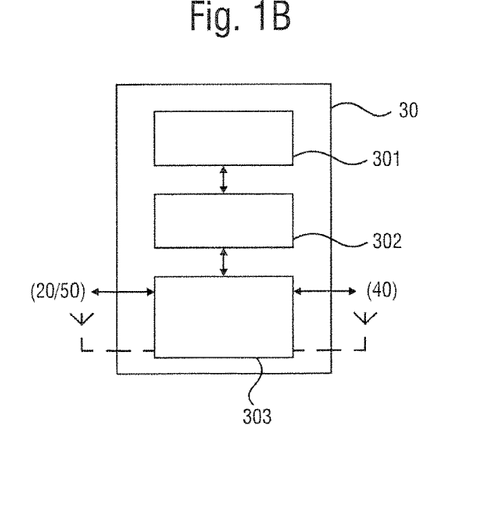
FIG. 1B shows a schematic view of an individual data collection unit according to another embodiment of the present invention.

FIG. 1B shows a schematic view of an individual data collection unit according to another embodiment. Accordingly, an individual data collection unit 30 includes a processing unit 302, a memory unit 301, and a communication unit 303. The memory unit 301 may store computer instruction code that can be executed on the processing unit 302 so as to implement the functionalities and method embodiments of the present invention. The communication unit 303 may optionally include one or two wireless communication devices that facilitate data exchange and communication toward network 20 (or to respectively super-ordinated level equipment 50) on the one hand and to one or more associated data acquisition units 40, 40' on the other. For example, data communication toward network 20 may be effected via a wireless link to level equipment 50, which, in turn has a DSL or LAN connection toward the internet. Likewise, communication toward an associated data acquisition unit may be implemented by means of a short-range radio link for which examples are discussed in conjunction with link 93 of FIG. 1A.

More specifically, the memory unit 301 stores computer instruction code that can be executed on the processing unit 302 so as to receive a message including configuration data for one associated data acquisition unit over communication unit 303, to extract the configuration data from the received message, and to transmit the extracted configuration data to the target data acquisition unit over communication unit 303. The above may involve determining, from the received message, the target data acquisition unit, for example by means of accessing and comparing addressing/identification data both being comprised in the received message and being stored in the data collection unit 30 (e.g. memory unit 301).

Figure 1C:
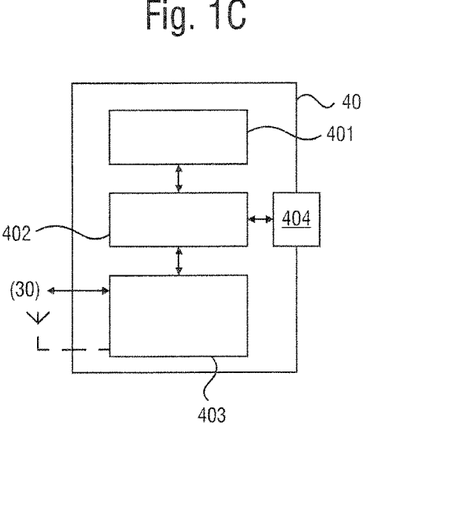
FIG. 1C shows a schematic view of an individual data acquisition unit according to another embodiment of the present invention.

FIG. 1C shows a schematic view of an individual data acquisition unit according to another embodiment. Accordingly, an individual data acquisition unit 40 includes a processing unit 402, a memory unit 401, and a communication unit 403. The memory unit 401 may store computer instruction code that can be executed on the processing unit 402 so as to implement the functionalities and method embodiments of the present invention. The communication unit 403 may optionally include one wireless communication devices that facilitates data exchange and communication toward the associated data collection unit 30. Again, communication toward an associated data acquisition unit may be implemented by means of a short-range radio link.

As a data acquisition unit it further includes a sensor unit 404 that is configured to acquire the desired data, by, for example, measuring one or more figures of interest. The sensor unit 404 may for this purpose employ sensor devices, current/voltage sources, light sources, thresholding circuits, analog-to-digital converters, averaging circuits, filter circuits, and the like. More specifically, the memory unit 401 stores computer instruction code that can be executed on the processing unit 402 so as to receive configuration data from the associated data collection unit, for configuring data acquisition as such and the data acquisition unit as a whole. In this context, it is referred to the aforementioned examples of an acquisition interval, precision, figure selection, setting the unit into a power-on, power-off, or idle state, or setting the transmission interval.

Figure 2A:
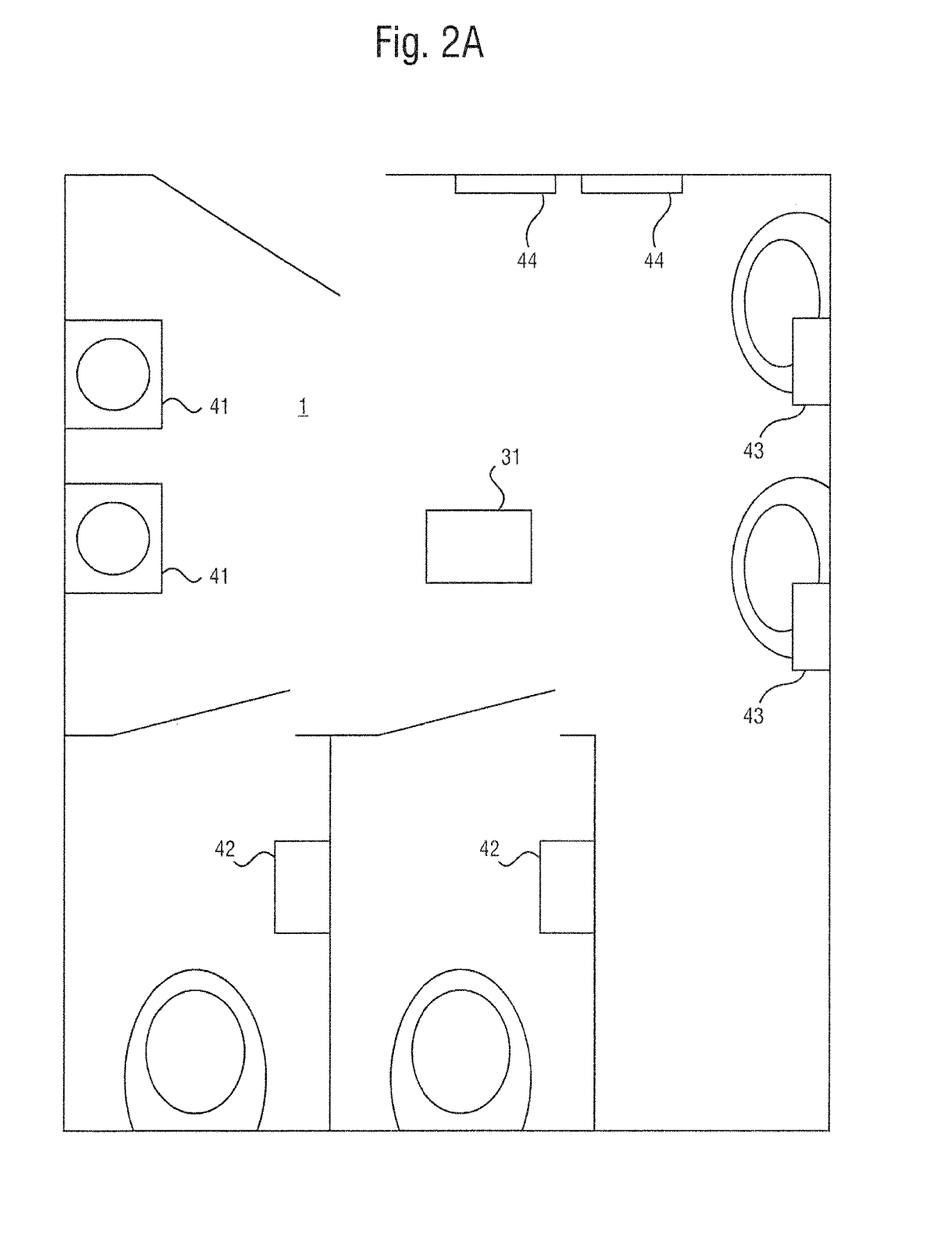
FIG. 2A shows a possible implementation of data collection equipment and data acquisition equipment in a facility according to another embodiment of the present invention.

FIG. 2A shows a possible implementation of data collection equipment and data acquisition equipment in a facility according to another embodiment, more specifically as a managed facility in the form of a restroom 1. Restroom 1 has several locations from which consumables may be dispensed, including waste bins 41, bathroom tissue dispensers 42, handwash dispensers 43, and hand towel dispensers 44. During usage of the restroom, handwash dispensers 43, hand towel dispensers 44, and bathroom tissue dispensers 42 may become depleted, while waste bins 41 may become filled.

In conventional facilities management approaches, a maintenance worker or team would periodically check restroom 1, including checking the levels in the dispensers 43, the quantity of hand towels in hand towel dispensers 44, the quantity of bathroom tissue in bathroom tissue dispensers 42, and the levels of waste in each of waste bins 41. The maintenance worker may make a judgement as to whether any of the resources are likely to need replenishment in the period before his next scheduled maintenance visit, and he may replenish those resources which are deemed to require such replenishment, provided that the worker has sufficient consumables on the maintenance cart. The maintenance worker may also empty bins 41, provided that the worker has sufficient remaining capacity for waste on the maintenance cart. If either the capacity for waste or the remaining resources on the cart are insufficient, the worker may either not replenish the resources or may adjust his route to visit a central storage location to resupply the cart before continuing.

In the present embodiment, restroom 1 of FIG. 2A also includes a data collection unit 31, for example a unit that is described as unit 30, 30' in conjunction with other embodiments. The data collection unit 31 has associated data collection units in each of the dispensers/bins 41-44. Specifically, these data acquisition units measure—respectively—towel-, tissue-, and soap consumption, and filling level of bins 41, so as to report this acquired data back via data collection unit 31 to a central entity for facility management. This data is transmitted on an uplink toward said central entity.

Figure 2B:
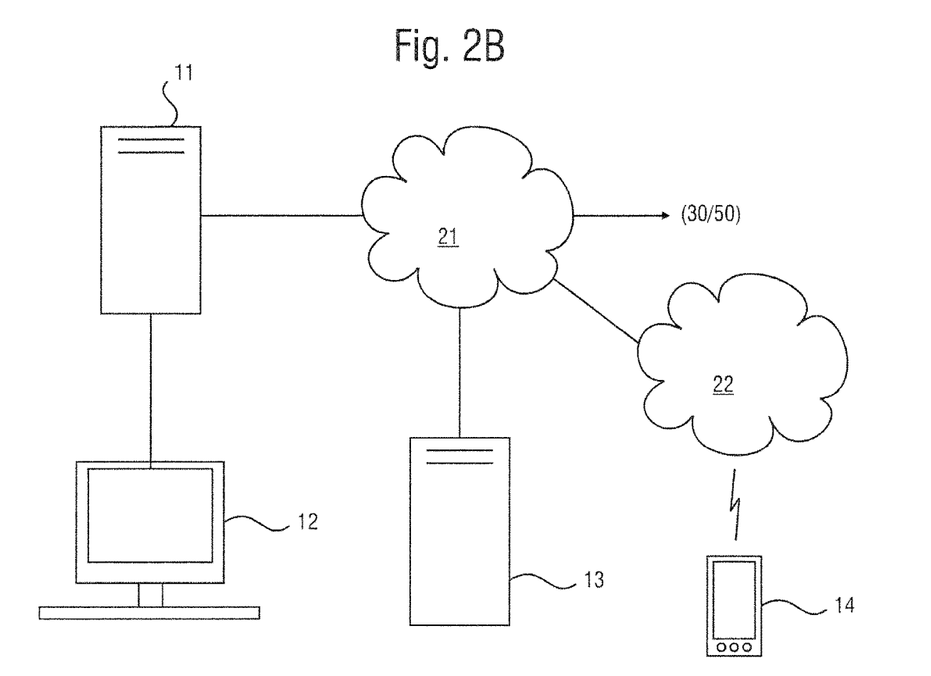
FIG. 2B shows an implementation of the central entity and related infrastructure, equipment, and further devices, according to another embodiment of the present invention.

FIG. 2B shows an implementation of the central entity and related infrastructure, equipment, and further devices, according to another embodiment. Over the various communication channels, all the distributed data acquisition equipment transmits data over the data collection equipment and network 21 to a central entity in the form of a server 11 or in the form of an application that runs on dedicated or distributed computing equipment. The information derived may be accessed and evaluated from an administrator workstation 12 connected to server 11, for example when a manager is planning the schedule of maintenance visits. Alternatively, the server 11 may, on the basis of the analysis performed of the usage data obtained about restroom 1, provide instructions or revised scheduling information to a hand-held unit 14 provided to a maintenance worker or in association with a particular maintenance cart to direct the maintenance worker to those facilities which urgently require servicing. Such hand held units 14 may employ any common mobile communication network 22. Further, additional optional processing- and/or database-resources may be involved in form of hardware 13.

By means of such a system as shown in FIGS. 2A and 2B, the maintenance worker need not visit a facility which does not require maintenance, and may preferentially visit those facilities which are particularly in need of maintenance. Thus, such a system may efficiently make use of maintenance resources such as workers, consumables and carts, while reducing the possibility for facilities to degrade into an undesirable state.

At the same time, the system as shown in FIGS. 2A and 2B allows for centralized configuration of the involved distributed data acquisition equipment. For example, a decision is taken that measurement intervals or precision of specific data acquisition equipment need adjustment. One possible scenario includes shortening the acquisition and reporting interval for data acquisition equipment during a particular event. For example, the facility may be a stadium which will include a large number of restrooms, beverage vending machines, parking ticket printers, etc. Whilst outside sporting events, most of the facilities run idle (i.e. no visitors are present that use the facilities), the situation may dramatically change during a sporting event, e.g. a football match. During such events, restroom usage, beverage vending, and parking ticket consumption will surge and facility management may be required to react quickly to—amongst others—depleting soap and towel dispensers, while waste bins get overfilled.

Following this example, acquisition and reporting intervals may need to be shortened so as to provide more accurate and up-to-date data. However, maintaining a short acquisition and reporting interval during all times, i.e. even outside sporting events or times of considerable use of the facilities, may result in increased resource usage/consumption by all the involved equipment. For example, battery-powered data acquisition units may constantly acquire and report data, although there is no current event, hence no visitors, and with this no substantial change/consumption to be actually reported.

This allows for taking into account these problems, by dynamically configuring the distributed data acquisition equipment with an improved usage of the available communication and power resources in the equipment. Namely, the configuration data for adjusting the acquisition and reporting interval is incorporated into a message that can be addressed specifically to the data collection equipment involved in the event, and, with this, to the all the data acquisition equipment that is subject to configuration adjustment. More specifically, configuration data can be transmitted as addressable messages only to the actually addressed data collection equipment. There, only the relevant configuration is extracted, and only the extracted configuration data is transmitted only to the respective target data acquisition units. In this way, all involved equipment makes efficient use of the communication and power resources available.

Figure 3:
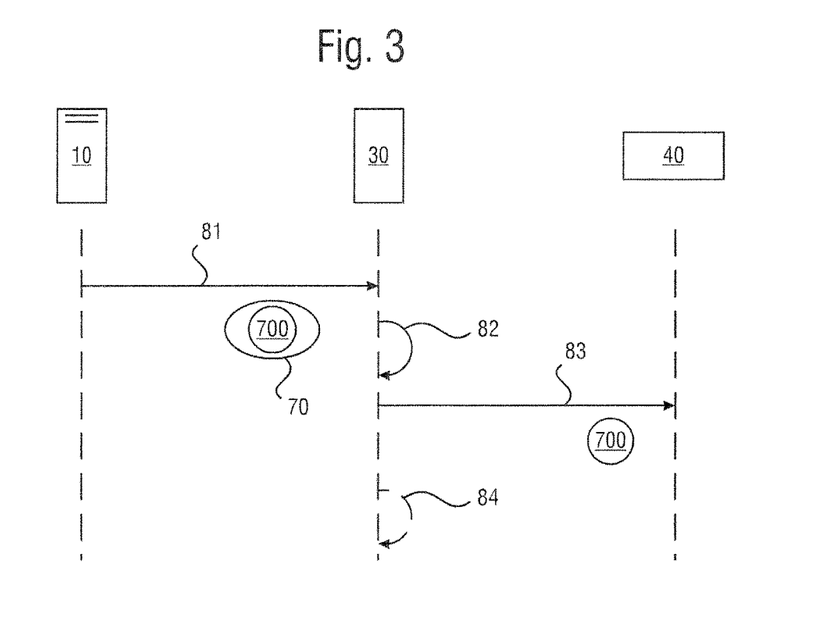
FIG. 3 shows a schematic view of message and data flow between the central entity, a data collection unit, and a data acquisition unit according to another embodiment of the present invention.

FIG. 3 shows a schematic view of message and data flow between the central entity, a data collection unit, and a data acquisition unit according to another embodiment. Accordingly, a central entity 10 obtains configuration data 700 for one specific data acquisition unit 40, selected data acquisition units 40 of an entirety of data acquisition equipment, or configuration data that is applicable to the data acquisition equipment as a whole. This configuration data 700 is incorporated into a message 70 to be sent to a data collection unit 30. The configuration data 700 may be comprised by message 70 in a one-to-one fashion, i.e., message 70 reproduces identically the configuration data 700, but the configuration data 700 may well be incorporated into message 70 by means of compression, selection, encryption, digitally signing, obfuscating, extracting, and the like.

Message 70 also includes a message body that distinguishes the message 70 as such from the configuration data 700 as such. The message body may include data that allows the communication links and/or the involved network equipment actually handling the network traffic to forward message 70 correctly from the central entity 10 to the specific data collection unit 30. For example, message 70 may include any suitable address information (e.g. TCP/IP header) that allows message 70 to be reliably forwarded to the target data collection unit 30. In general, the message body may be identified as the remainder from the message when the configuration data (payload) is removed.

Further, the message body may also include data that is addressed to the data collection unit 30 and is not concerned with the data acquisition unit 40. Such data may include configuration data for the data collection unit 30 and/or data that the data collection unit 30 requires in order to be able to forward the configuration data 700 to the correct data acquisition unit 40. In the latter case, this data may specifically include identification data so as to identify the respective data acquisition unit 40. Namely, the recipient data collection unit 30 uses said data to determine the correct target data acquisition unit 40 to which the configuration data 700 needs to be transmitted. A message 70 is generated by including the configuration data 700 in a suitable message body.

This so generated message 70 is then forwarded in step 81 to the data collection unit 30. In step 82, the message 70 is processed in the data collection unit 30 so as to extract the configuration data 700. This processing may, for example, include evaluation of a message body or remaining data of the message 70 so as to identify the correct data acquisition unit 40 to which the configuration data 700 is addressed. Such processing may also include decrypting, decompressing, re-arranging in the correct order, adding of further commands and support data, and the like. In any way, the one or more data acquisition units 40 to which the configuration data 700 is to be forwarded are determined. Once this determination is completed, configuration data 700 can be transmitted to the addressee data acquisition unit 40 in step 83. Optionally, in step 84, configuration data possibly addressed to the data collection unit 30 itself is processed and executed.

In this way, only necessary data is transmitted over the respective network links. For example, the remainder of message 70 is omitted in step 83, since only the configuration data 700 is of interest to the target data acquisition unit 40. In this way, both the data collection unit 30 and the data acquisition unit 40 save power and communication resources by avoiding the transmission of data that is of no interest to the target (data acquisition unit 40) and which was, moreover, already processed and evaluated by the data collection unit 30. In other words, any information identifying the target data acquisition unit 40 that forms part of message 70 needs not to be transmitted to the data acquisition unit 40, since transmission of the configuration data 700 to the specific data acquisition unit already makes inherent and exhaustive use of such identifying information.

Figure 4A:
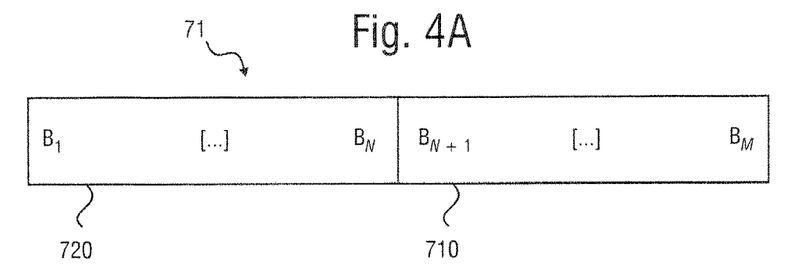
FIG. 4A shows a schematic view of another message format.

FIG. 4A shows a schematic view of another message format. Accordingly, a message 71 includes a message body 720 and configuration data 710. The message can be in the form of a string of Mbytes, whereas the first N bytes ($B_1$ to $B_N$) constitute the message body 720, and bytes N+1 ($B_{N+1}$) to byte M ($B_M$) constitute the configuration data 710. In this way, message 71 is a simple concatenation of bytes $B_1$ to $B_M$ so as to form the message body and the configuration data.

In this example, the configuration data 710 can be extracted from message 71 by extracting bytes $B_{N+1}$ to $B_M$. Assuming that message body 720 and configuration data 710 are of comparable length, the extracting and forwarding of only bytes $B_{N+1}$ to $B_M$ to the target data acquisition unit saves approximately both half the communication and power resources as compared to forwarding the entire message 70.

Figure 4B:
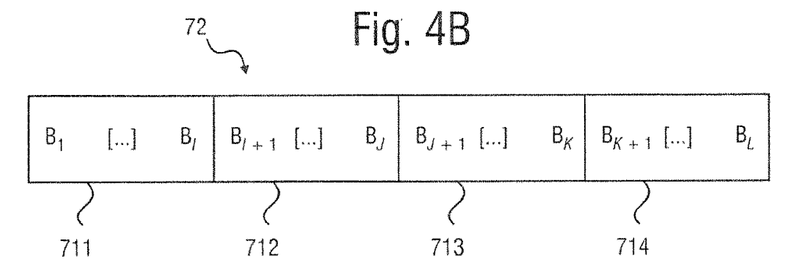
FIG. 4B shows a schematic view of another message format.
Figure 5:
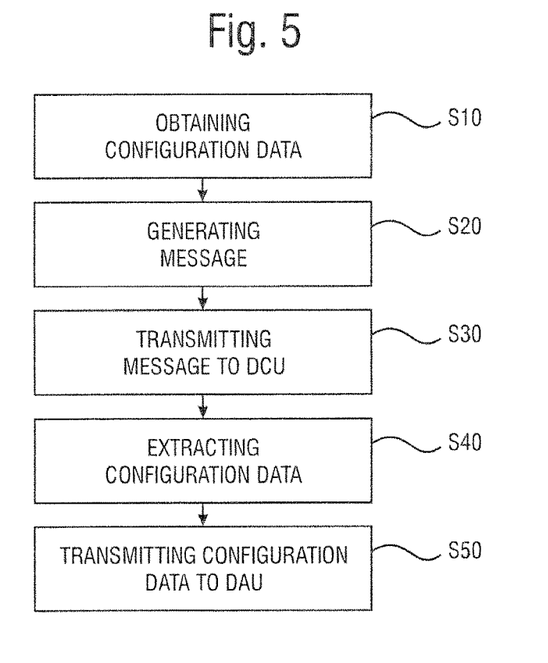
FIG. 5 shows a flowchart of one method.

FIG. 4B shows a schematic view of another message format. Accordingly, a message 72 includes a message header 711, identification data 712, conditional data 713, and configuration data 714. Again, message 72 can be in the form of a string of L bytes, whereas the bytes $B_1$ to $B_J$ constitute the message header 711, bytes $B_{J+1}$ to $B_K$ constitute the conditional data 713, and bytes $B_{K+1}$ to $B_L$ constitute the configuration data 714.

More specifically, message header 711 can include information on routing the message 72 within a network or, in general, to a specific data collection unit 30 (e.g. TCP/IP) header. Therefore message header 711 may include identification data for identifying the target data collection unit 30 in the form of a IP-address and/or data collection unit identification. Further, identification data 712 may indicate a specific data acquisition unit 40 to which the configuration data 714 is to be sent. The data collection unit can extract data 712 so as to determine the correct data collection unit 40 to which the configuration data 714 is to be transmitted. According to this embodiment, there is optionally provided conditional data 713 which may also be evaluated by the data collection unit so as to determine whether the configuration data 714 is transmitted to the data acquisition unit 40 or not. Conditional data 713 may also determine other factors, such as a point in time when the configuration 714 is to be transmitted, what parts/sections of configuration data 714 are actually transmitted to the data acquisition unit 40, and the like. In this way, both the configuration of message 72 and the "intelligence" in the data collection unit for being able to extract data from received messages allows for a flexible configuration, and, with this, an even more efficient use of the available resources. For example, data 711 may already be dispensed within optional level equipment 50 once the target data collection unit(s) 30 have been determined. Then, only a truncated message comprising data 712, 713, and 714 needs to be actually transmitted to a data collection unit.

Further, distribution and forwarding of the configuration data 714 may be subject to conditions by use of the conditional data 713. For example, conditional data 713 can be used to specify conditions that must be met before the configuration data 714 is

The invention claimed is:

1. A method of configuring distributed data acquisition equipment comprising at least one data collection unit and at least one data acquisition unit coupled to the data collection unit, the method comprising:

obtaining, by a server, data acquisition unit configuration data for the at least one data acquisition unit;

generating, by the server, a message comprising identification data, message body, and the data acquisition unit configuration data, said identification data indicating the at least one data acquisition unit to which the configuration data should be sent;

transmitting said message to a data collection unit coupled to the at least one data acquisition unit;

extracting in the data collection unit the data acquisition unit configuration data from the message; and forwarding the extracted data acquisition unit configuration data to the at least one data acquisition unit referenced in said identification data, wherein said identification data and said message body are omitted.

2. The method of claim 1, further comprising a step of determining the data collection unit to which the at least one data acquisition unit is coupled, and a step of addressing the message to the determined data collection unit.

3. The method of claim 1, wherein the message is transmitted to the data collection unit via intermediate level equipment, the intermediate level equipment forwarding at least a part of the message to the data collection unit.

4. The method of claim 3, further comprising a step of associating the intermediate level equipment of one specific level to a facility property.

5. The method claim 1, wherein the data acquisition equipment is distributed over a facility, a site, a building, and/or a story.

6. The method of claim 1, wherein the at least one data acquisition unit comprises a sensor measuring number of consumable items used, filling level of dispensers or waste receptacles for consumable items, or expiry date of consumable items.

7. The method of claim 6, wherein the consumable items comprise paper, handwash, food, or beverages.

8. The method of claim 1, wherein the data acquisition unit configuration data indicates any one of an acquisition interval, a precision, a figure selection, a setting of a unit into a power-on, power-off, or idle state, or a transmission interval.

9. The method of claim 1, wherein the server is coupled to the distributed data acquisition equipment over a network, and the method further comprises a step of the server providing the data acquisition unit configuration data.

10. The method of claim 1, wherein said message further comprises conditional data specifying conditions of the at least one data acquisition unit referenced in said identification data to be met before transmitting the data acquisition unit configuration data, and wherein said method further comprises evaluating, in the data collection unit, the conditional data so as to determine whether the specified conditions of the at least one data acquisition unit are met by the at least one acquisition unit referenced in said identification data and forwarding the extracted data acquisition unit configuration data to the data acquisition unit referenced in said identification data only if the specified conditions are met.

11. A data collection unit for receiving acquired data from a data acquisition unit, the data collection unit comprising memory, processor, and communication unit, which are configured to:

receive, from a network, a message comprising identification data, message body, and data acquisition unit configuration data, said identification data indicating the at least one data acquisition unit to which the configuration data should be sent;

determine, from the message, a target data acquisition unit to which the data acquisition unit configuration data is to be transmitted;

extract the data acquisition unit configuration data from the message;

and forward the extracted data acquisition unit configuration data to the data acquisition unit referenced in said identification data, wherein said identification data and said message body are omitted.

12. The data collection unit of claim 11, wherein the memory is further configured to store identification data for one or more associated data acquisition units, and the processor is configured to determine the data acquisition unit referenced in said identification data on the basis of the message and the stored identification data.

13. The data collection unit of claim 11, wherein the processor is further configured to determine the data acquisition unit referenced in said identification data on the basis of a message body being different from the data acquisition unit configuration data in the message.

14. The data collection unit of claim 11, wherein the processor is further configured to process a message body being different from the data acquisition unit configuration data in the message, and to determine the data acquisition unit referenced in said identification data on the basis of a processing result.

15. The data collection unit of claim 11, wherein the processor is further configured to process, decompress, decrypt, rearrange, and/or to expand the extracted data acquisition unit configuration data before transmitting it to the data acquisition unit referenced in said identification data.

16. The data collection unit of claim 11, wherein the communication unit is further configured to communicate toward the network over a radio link.

17. The data collection unit claim 11, wherein the communication unit is further configured to communicate with the data acquisition unit over a radio link.

18. The data collection unit of claim 11, wherein the processor is further configured to extract configuration data for the data collection unit from the message.

19. The data collection unit of claim 18, wherein the processor is further configured to execute the configuration data for the data collection unit before transmitting the extracted data acquisition unit configuration data for the data acquisition unit.

20. The data collection unit of claim 11, further comprising an internal power source.

21. The data collection unit of claim 11, further being adapted to be coupled to a server over a network, the server providing the data acquisition unit configuration data.

22. The data collection unit of claim 11, wherein said message further comprises conditional data specifying conditions of the at least one data acquisition unit referenced in said identification data to be met before transmitting the data acquisition unit configuration data, and wherein said data collection unit is further configured to evaluate the conditional data so as to determine whether the specified conditions of the at least one data acquisition unit are met by the at least one acquisition unit referenced in said identification data and to forward the extracted data acquisition unit configuration data to the data acquisition unit referenced in said identification data only if the specified conditions are met.

23. A data acquisition system comprising a server, at least one data collection unit coupled to the server over a network and at least one data acquisition unit coupled to the data collection unit, the data acquisition system being configured to:

obtain, by the server, data acquisition unit configuration data for the at least one data acquisition unit;

generate, by the server, a message comprising identification data, message body, and the data acquisition unit configuration data, said identification data indicating the at least one data acquisition unit to which the configuration data should be sent;

transmit said message to a data collection unit coupled to the at least one data acquisition unit;

extract in the data collection unit the data acquisition unit configuration data from the message; and forward the extracted data acquisition unit configuration data to the at least one data acquisition unit referenced in said identification data, wherein said identification data and said message body are omitted.

24. The data acquisition system of claim 23, wherein said message further comprises conditional data specifying conditions of the at least one data acquisition unit referenced in said identification data to be met before transmitting the data acquisition unit configuration data, and wherein said data acquisition system is further configured to evaluate, in the data collection unit, the conditional data so as to determine whether the specified conditions of the at least one data acquisition unit are met by the at least one acquisition unit referenced in said identification data and to forward the extracted data acquisition unit configuration data to the at least one data acquisition unit referenced in said identification data only if the specified conditions are met.

* * * * *